(12) United States Patent
Hashizume et al.

(10) Patent No.: US 6,187,458 B1
(45) Date of Patent: Feb. 13, 2001

(54) FERROMAGNETIC FINE LINE AND MAGNETIC APPARATUS THEREOF

(75) Inventors: Tomihiro Hashizume, Hiki-gun; Satoshi Watanabe, Wakou; Toshiyuki Onogi, Higashimatsuyama; Yasuo Wada, Bunkyou-ku; Masahiko Ichimura, Hiki-gun; Yoshimasa Ono, Mito, all of (JP)

(73) Assignee: Hitachi, Ltd., Tokyo (JP)

( * ) Notice: Under 35 U.S.C. 154(b), the term of this patent shall be extended for 0 days.

(21) Appl. No.: 09/110,183

(22) Filed: Jul. 6, 1998

(30) Foreign Application Priority Data

Jul. 8, 1997 (JP) .................................... 9-182096

(51) Int. Cl.[7] ....................................... G11B 5/66
(52) U.S. Cl. .............. 428/692; 428/694 T; 428/694 TP; 428/694 R; 428/900; 360/113; 324/252; 250/492.2
(58) Field of Search ......................... 428/694 TR, 694 T, 428/694 R, 900, 692; 250/492.2; 360/113; 324/252

(56) References Cited

U.S. PATENT DOCUMENTS 5,561,300 10/1996 Wada et al. ................... 250/492.2
5,968,677 * 10/1999 Watanabe .................... 428/692

OTHER PUBLICATIONS

"Peculiar Localized State at Zigzag Graphite Edge", M. Fujita et al, Journal of Physical Society of Japan, vol. 65, 1996, pp. 1920–1923.

"Interaction of Ga Adsorbates with Dangling Bonds on the Hydrogen Terminated Si(100) Surface", by T. Hashizume et al, Japanese Journal of Applied Physics, vol. 65, 1996, pp. 1085–1088.

"Single–domain magnetic pillar array of 35nm diameter and 65Gbits/in2 density for ultrahigh density quantum magnetic storage", by S. Y. Chou et al; Journal of Applied Physics, vol. 76, 1994, pp. 6673–6675.

"Properties and measurement of scanning tunneling microscope fabricated ferromagnetic particle ararys (invited)", A.D. Kent et al, Journal of Applied Physics, vol. 76, 1994, pp. 6566–6660.

Tokyo Daigaku Bussei Kenkyu–jo, "Bussei Kagaku Jiten", Tokyo Shoseki, 1996, pp. 198–200.

* cited by examiner

Primary Examiner—Leszek Kiliman
(74) Attorney, Agent, or Firm—Mattingly, Stanger & Malur, P.C.

(57) ABSTRACT

A ferromagnetic fine line has no loss of spontaneous magnetization even when fabricated ultra-small. The magnetization can be controlled by the proximity of the electrodes and the atomic level structure, and is protected from adsorption of impurities by embedding the ferromagnetic fine line in a nonmagnetic atomic layer.

15 Claims, 11 Drawing Sheets

ELECTRONIC STATE DENSITY

FERROMAGNETIC FINE LINE AND MAGNETIC APPARATUS THEREOF

BACKGROUND OF THE INVENTION

This invention relates to a ferromagnetic fine line and magnetic apparatus ideal for utilization in a wide range of applications such as high density magnetic recording and magnetic sensors by controlling magnetization by means of the proximity of the electrodes and the structure on an atomic level, and by preserving the magnetization characteristics by embedding on a nonmagnetic atomic layer.

Material with ferromagnetic characteristics has the property of spontaneous magnetization, in other words, the characteristic of generating a finite amount of magnetism without application of power to the magnetic material. The finite magnetization of the ferromagnetic material; might not be indicated by the bulk quantity of magnetic material however, a piece of ferromagnetic material can be internally divided into a plurality of regions. Each of these regions shows a finite amount of magnetism; however, the direction of the magnetism differs with each respective region. These regions, in other words, each small zone where the magnetism has a fixed direction, is referred to as a magnetic domain.

Material having ferromagnetic properties is utilized in many ways in a wide variety of applications, such as all kinds of magnetic recording and magnetic sensors. Development of material with ferromagnetic properties suited for different objectives is currently proceeding at a vigorous pace. In the area of magnetic recording in particular, to meet demands for ever greater high density recording, a crucial issue is how to make these magnetic domains as small as possible in as few magnetic domains as possible and yet still perform magnetic recording.

Practical magnetic recording is currently still at the stage of having to use a plurality of magnetic domains per unit of magnetic recording. Preferably, a single magnetic domain should function as a magnetic recording unit and the size of this magnetic domain should preferably be as small as possible. A method utilizing electron beam lithography, for instance, to make small magnetic domains in ferromagnetic material has been proposed in the Journal of Applied Physics, Vol. 76, pp. 6673–6675 (1994). In this method, regions of several dozen nanometers consisting of magnetic atoms were formed on a nonmagnetic substrate, in other words a substrate showing no ferromagnetic properties, and a ferromagnetic pillar array consisting of a single magnetic domain were also reported. Atoms discovered with ferromagnetic properties here having a single bulk quantity were the 3d transition metals Cr, Mn, Fe, Co, Ni as well as the lanthanides Ce, Pr, Nd, Pm, Sm, Eu, Gd, Tb, Dy, Ho, Er, Tm, Yb, Lu. A method proposed in the Journal of Applied Physics, Vol. 76, pp. 6656–6660 (1994), for instance, showed that ferromagnetic particle arrays of approximately the same size can be formed by depositing the ferromagnetic material on a nonmagnetic substrate utilizing the probe of a scanning tunneling microscope (STM).

However, merely applying these two methods as is in order to achieve a still further reduction in the size of the magnetic portion will not work well. The reason can be explained with the Stoner model which is often used to describe typical ferromagnetic material such as Fe, Co, and Ni. This Stoner model, as related in the Tokyo University Bussei Kenkyu-jo, "Bussei Kagaku Jiten", pp. 198–200, Tokyo Shoseki (1996), expresses conditions (Stoner conditions) for discovering ferromagnetism by $U \times D(EF) > 1$ where U is the electron correlation energy or energy of coulomb repulsion between electrons and D (Ef) is the electron state density at the Fermi level EF. Therefore, a material must have an extremely large state density D (EF) at the Fermi level in order to exhibit ferromagnetic properties. However, when the bulk ferromagnetic piece for satisfying the above mentioned Stoner conditions is comprised of atomic cluster types of a minute size or elongated atomic types, then the state density D (EF) decreases drastically due to the finite size effect. Consequently, the Stoner condition has not been met and there is a high probability that the spontaneous magnetism has been lost. Accordingly, a new method completely different from those of the conventional art is required in order to achieve a ferromagnetic fine line with even smaller magnetic domains.

SUMMARY OF THE INVENTION

In view of the above problems it is therefore an object of the present invention to provide a ferromagnetic fine line and a magnetic apparatus thereof characterized by being able to control the magnetization by means of the proximity of the electrodes and the structure on an atomic level, and able to protect the magnetization characteristic from the adherence of impurities by means of embedding in an atomic layer, with no loss of spontaneous magnetization when the magnetic domains are even smaller than the conventional art.

In order to resolve the above mentioned problems, this invention utilizes the fact that the array of the atomic cluster (including molecules) of the solid surface and atoms on the solid surface, differs from the electron state of a bulk (solid); in other words, a lump or cluster that is macroscopic in size. Restated, ferromagnetic properties can be discovered by the appropriate array or ordering of atoms on the surface of a substrate. Further, embedding within a protective atom layer ensures that no loss of magnetization characteristics will occur on the surface of the solid with this atomic array, and weakening of magnetization characteristics is prevented by absorption of impurities. One other special feature deserving note in this atomic level array, is that ferromagnetic characteristics can be displayed just by using non-magnetic atoms. Here nonmagnetic atoms indicates atoms without magnetic properties, excluding atoms previously defined as magnetic or rare gas molecules (He, Ne, Ar, Kr, Xe, Rn). In this atomic level array, ferromagnetism can be expressed with nonmagnetic atoms and magnetic atoms, or just with magnetic atoms.

As related previously, conditions (Stoner condition) for displaying ferromagnetism are expressed by $U \times D(Ef) > 1$ where U is the electron correlation energy or energy of coulomb repulsion between electrons, D (Ef) is the electron state density at the Fermi level. Therefore, even in a bulk (solid) of substance groups with nonmagnetic characteristics, ferromagnetism can be obtained if the Stoner condition of $U \times D(Ef) > 1$ can be satisfied by the proper array of atoms on the surface of the substrate. The appearance for instance, of spontaneous magnetism at the end of ribbon-shaped graphite can theoretically be predicted as mentioned in the Journal of the Physical Society of Japan, Vol. 65, pp. 1920–1923 (1996). However such a structure is only theoretical and has not actually been achieved.

In this invention, ultra-fine fabricating technology is utilized on the atomic level by utilizing methods such as STM to form an atomic level array or order on the surface of a nonmagnetic substrate. At this time, the detailed configuration of the state density of the atomic level array will vary according to the atomic type and array, and this invention is characterized in that the peak of the state density occurs in the vicinity of the Fermi level. The peak of this state density permits the Stoner condition to be satisfied and ferromagnetism to be achieved.

BRIEF DESCRIPTION OF THE DRAWINGS

FIG. 4A is a plan view of the substrate surface. FIG. 4B is a plan view of the upper layer portion of the layer of the ferromagnetic fine line shown in FIG. 4A. FIG. 4C is a plan view of the uppermost layer of the ferromagnetic fine line shown in FIG. 4C.

DESCRIPTION OF THE PREFERRED EMBODIMENTS

Hereafter a detailed explanation of the preferred embodiments will be made while referring to the accompanying drawings.

<First Embodiment>

Figure 1:
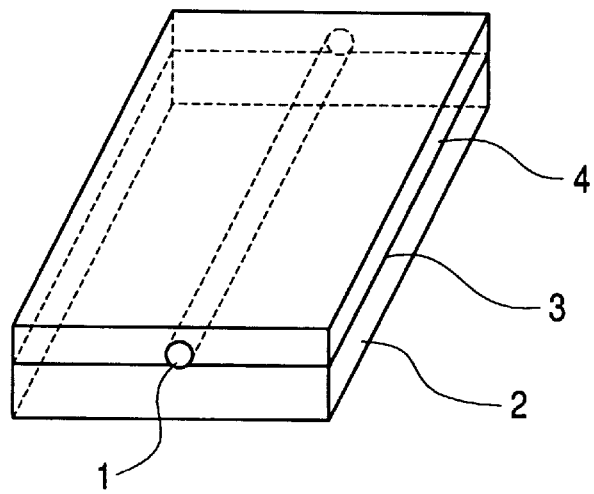
FIG. 1 is a concept view of the structure of the ferromagnetic fine line of this invention.

FIG. 1 shows a concept view of the structure of the ferromagnetic fine line of this invention. As is related later on in the detailed description of an example of the fabrication process, ultra-fine machining technology on the atomic level with techniques such as STM are employed to form an atomic level array 1 having ferromagnetic properties on a surface 3 of a nonmagnetic substrate 2, and embed this atomic level array 1 into a protective layer 4 of nonmagnetic atoms.

Figure 2:
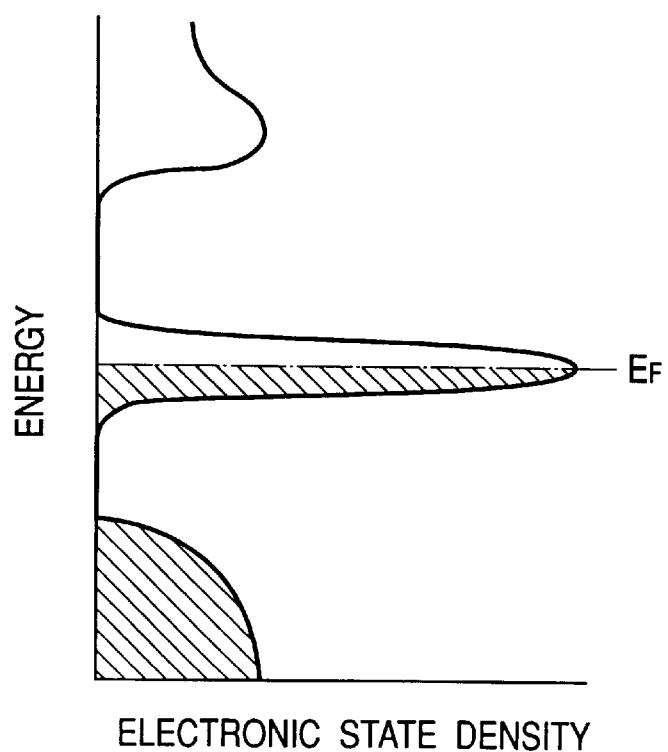
FIG. 2 is a graph showing the state density of the basic unit of the ferromagnetic fine line of this invention.

FIG. 2 is a graph showing the state density of the basic unit of the ferromagnetic fine line of this invention. The characteristic feature is the presence of a state density peak near the Fermi level EF. This state density peak satisfies the Stoner condition and achieves ferromagnetism. However, the detailed configuration of the electron state density of the atomic level in FIG. 1 is subject to fluctuations due to the type of atom and atom array being used. Also, almost all the atoms comprising the protective layer 4 and the nonmagnetic substrate 2 of this invention are nonmetallic atoms.

Figure 3A:
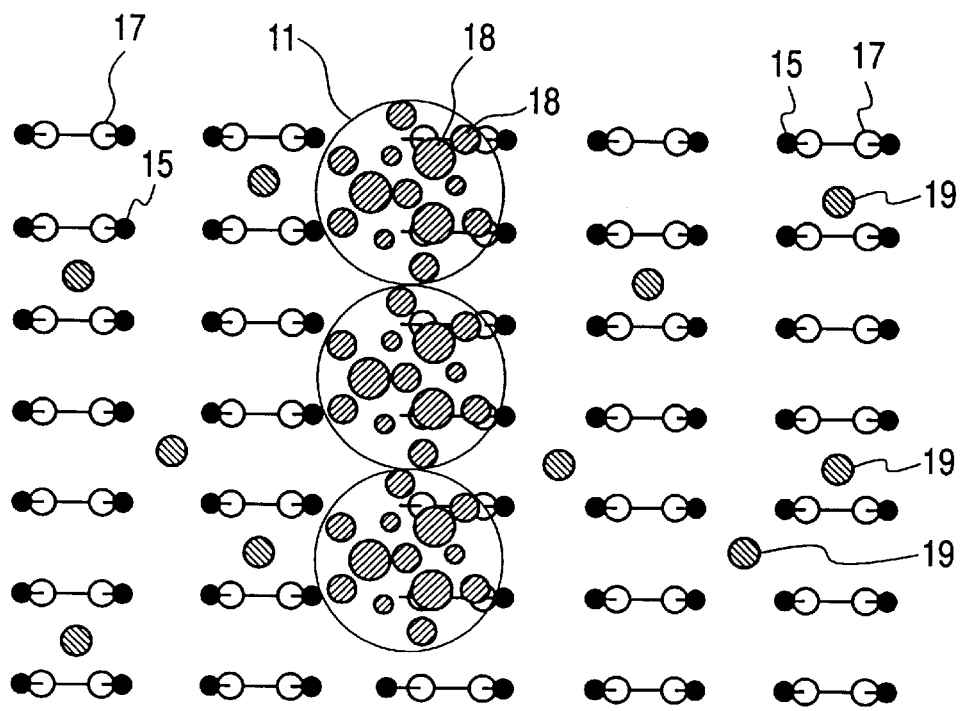
FIG. 3A is a plan view showing an example of the ferromagnetic fine line without the protective layer.
Figure 3B:
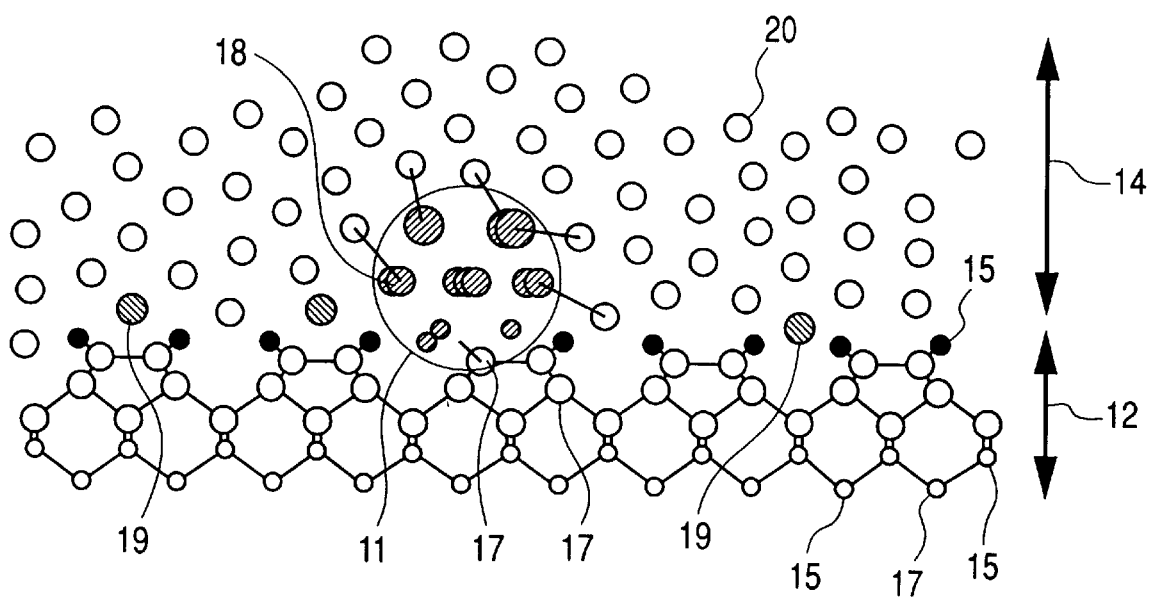
FIG. 3B is a side view showing the ferromagnetic fine line including the protective layer.

FIG. 3A is a plan view showing an example of the ferromagnetic fine line and FIG. 3B is a side view. In FIGS. 3A and 3B, a silicon Si substrate (100) is utilized as a nonmagnetic substrate 12. The atoms comprising the silicon substrate (100) are silicon atoms 15 forming dangling bonds terminated by atoms or a molecule 16 (in this example hydrogen atoms) to ensure that the surface structure is stable and chemically inert. Afterwards, an STM probe is brought to the vicinity of the surface of the silicon substrate terminated with hydrogen and a suitable voltage pulse is applied (typically 2.9 volts, 100 ms) or suitable current voltage (typically 1 nA, 3.5 volts) administered while moving the probe to extract the hydrogen atoms and form the structural atoms 17 (here Si) with the dangling bonds, into a single dimensional of row of dangling silicon bonds (Si dangling hydrogen type) in the shape of a fine line. The row of dangling hydrogen Si bonds is more active chemically than the hydrogen-terminated Si surface structure so that a thermal evaporation source can be utilized to absorb Ga atoms as required to form atoms in an atomic size array in the row of hydrogen dangling Si bonds. Here, Ga atoms 18 are selectively absorbed to form the atomic array. A specific procedure to accomplish the specific aforementioned steps is already known and is listed for instance in the Japanese Journal of Applied Physics Letters, Vol. 35, pp. 1085–1088 (1996).

Further, in this invention, by increasing and controlling the vaporization of the structural atoms 18 (here Ga atoms) of the atom size array, the atomic level array is formed from the atomic clusters 11 that comprise the basic unit of the ferromagnetic fine line. Further, the structural atoms 20 of the protective layer may form the protective layer 14 by for instance vaporizing Si. At this time, slightly (within about 1 atom layer) vaporizing the atoms 19 (Ti in this example) having the role of fixing the structural atoms of the protective layer on a substrate layer 12 will prove effective on the hydrogen dangling Si surface in order to control the dispersion distance of the structural atom 20 of the protective layer. In FIG. 3A and FIG. 3B, shown as an example, a basic unit of 13 Ga atoms are used as the base ferromagnetic unit for the atomic cluster 11, however the magnetism of this atomic level array can be controlled by regulating the quantity and type of atoms included in this base unit. The configuration of this embodiment of FIGS. 3A and 3B has an energy band structure as shown in FIG. 2 due to prediction by means of the first-principles calculation based on the local density functional method, and the magnetism was actually verified by STS (scanning tunnel spectrometer).

Figure 4A:
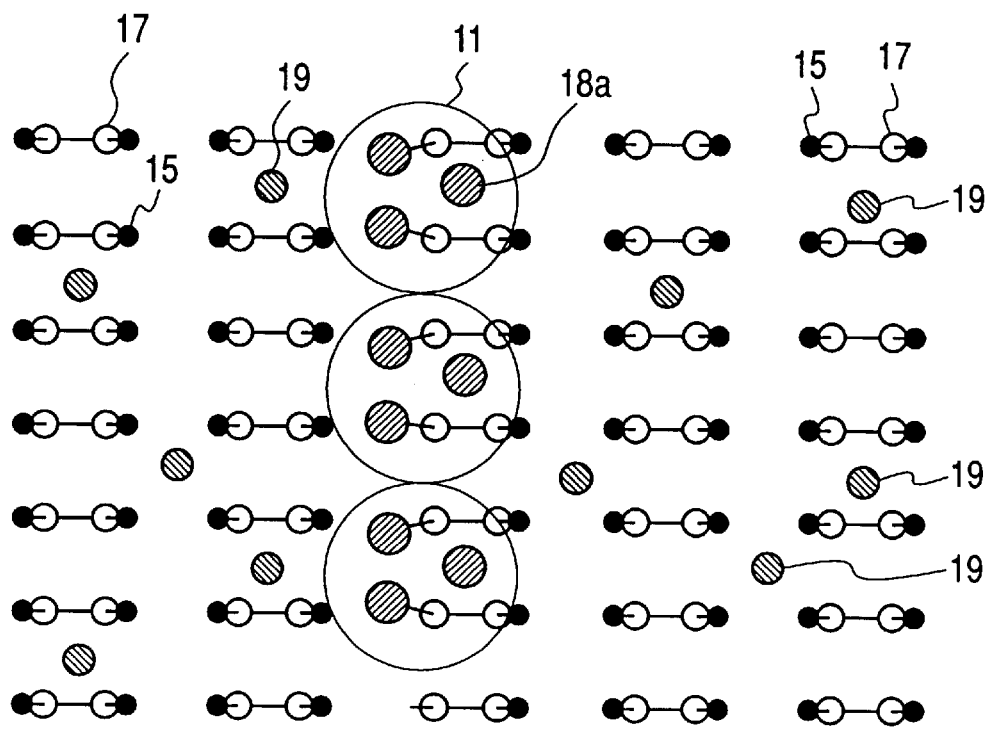
FIGS. 4A through 4C are exploded views concentrating on the layer structure of the ferromagnetic fine line of the plan view shown in FIG. 3A.
Figure 4B:
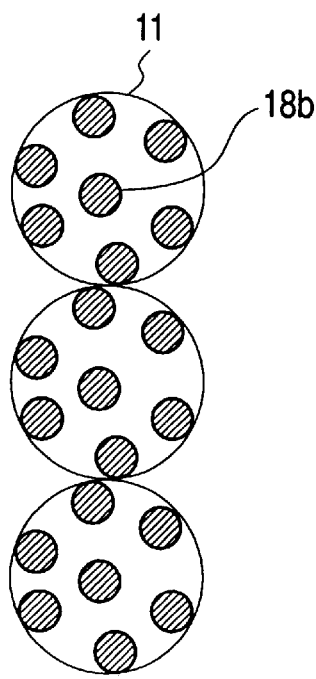
Figure 4C:
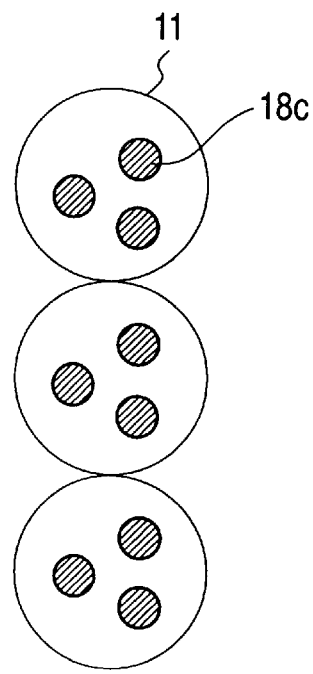

FIGS. 4A through 4C are exploded views showing the layer structure of the ferromagnetic fine lines shown in the plan view of FIG. 3A. FIG. 4A shows the status when the three atoms 18a of the atomic cluster 11 forming the base unit of the ferromagnetic fine line on the substrate surface bond with the structural atoms of the substrate. FIG. 4B shows the status when seven of the atoms 18b of the atom cluster 11 on the upper section of the layer shown in FIG. 4A are present in a layer shape. FIG. 4C shows the status when three of the atoms 18c of the atomic cluster 11 of the upper part of this layer are present in a layer shape. When using Ga atoms to comprise the ferromagnetic body, the atom cluster 11 forming the base unit is comprised of thirteen Ga atoms as shown in the figure.

Figure 5:
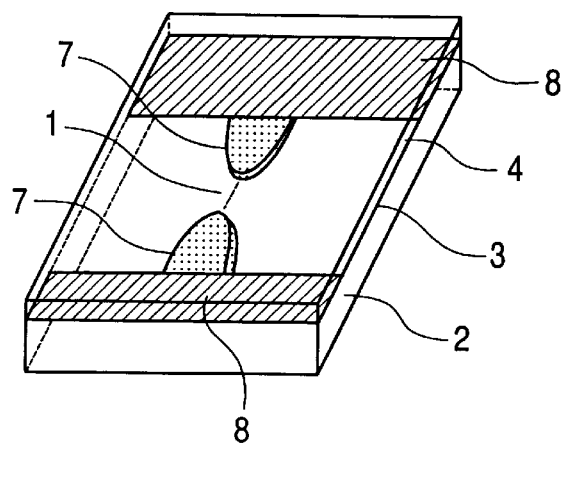
FIG. 5 is a view showing the connection method of the external electrodes with the atomic size array of the ferromagnetic fine line of this invention.

FIG. 5 is a view showing the connection method of the external electrodes with the atomic size array of the ferromagnetic fine line of this invention. The atomic level array of this invention utilizes the typical method for connection with the external electrodes. An example is described where the dangling bond of Si molecules on the surface is terminated with hydrogen atoms and Si (100) is utilized as the nonmagnetic substrate 2. First of all, the center section of the material surface is covered with a metal mask and a bulk wire 8 is fabricated comprised of bonding pads and one or more than one non-intersecting wire lines. A metal such as gold (Au) which is stable in air may be utilized and a thin film of approximately 5 nm is formed by a vaporization method, etc. Slightly vaporizing (within about 1 atom layer) the atoms (Ti in this example) having the role of securing the metal atoms on the substrate will prove effective at this time, the same as with the atoms 19 having the role of securing the structural atoms of the protective layer to the substrate as in FIG. 3A and FIG. 3B, in order to control the dispersion distance of the metal atoms on the hydrogen terminated Si surface.

The unprocessed zone covered by the metal mask is a zone forming the atomic level array 1 and the remaining intermediate connection electrode 7, and while the usual metal mask has a minimum width of approximately 5 microns, this width can in particular here be reduced to approximately 1 micron by machining with a convergence ion beam.

Next, just as in the fabrication method for the above mentioned dangling Si bond, an STM probe is utilized to fabricate a dangling Si bond region in a zone of the surface 3 that forms the electrode. An intermediate connection electrode 7 can be fabricated by adsorbing metal atoms such as gallium (Ga) utilizing for example, a heat vaporization source. The boundary of the bulk wire 8 and the unprocessed zone can be smoothly connected by suitable dispersion of the metal atoms to obtain a satisfactory electrical connection. The next step, which is the forming method for the atomic level array 1, is just the same as explained for FIG. 3A and FIG. 3B. The protective layer 4 is formed by covering with a metal mask and laminating with nonmagnetic atoms in zones other than for the bonding pads formed by the bulk wire 8. The method explained here for connecting the external electrode and the atomic size array 1 can be applied in actual cases where other types of atomic level structures are used.

The example of this embodiment utilized Si atoms as the structural atom 15 for the substrate; however, semiconductors such as Ge or GaAs or insulators such as NaCl may be utilized instead of Si as the substrate. Further, the dangling bond in the example of this embodiment is terminated with a hydrogen atom; however, atoms or molecules other than hydrogen can be utilized for the termination. For instance, termination with a methyl radical will prove effective. Terminating this kind of dangling bond and lowering the level of chemical activization is very effective in making the machining easier; however, such a step is not always necessary. Actually, slight adsorption of the Ga atoms beforehand with the STM probe and then applying a pulse voltage with the probe from the vicinity of the surface to move the Ga atoms from the probe to the surface, can be used as a processing method to fabricate a structure identical to that in FIG. 3A and FIG. 3B. In other words, this processing is not limited to the application of a high voltage, but other methods can generally be used for adsorbing inert atoms of hydrogen and oxygen and other dangling bonds, as well as methods such as making the dangling bonds inert or changing the surface structure; such as by removal of surface atoms by chemical reactions per inductive molecule or by electrical field, electrical current, light, magnetic waves, heat, contact such as utilizing STM or SPM (scanning probe microscope) or their use on the surface to excite inductive molecules. Further, on surfaces inert with surface dangling bonds, a desired pattern can be formed on a surface where dangling bonds are present by performing processing to restore these dangling bonds with methods to activize the dangling bonds, such as removal of inert atoms of hydrogen and oxygen and other dangling bonds, as well as methods such as making the dangling bonds inert or changing the surface structure; such as by removal of surface atoms by chemical reactions per inductive molecule or by electrical field, electrical current, light, magnetic waves, heat, contact such as utilizing STM or SPM (scanning probe microscope) or their use on the surface or to excite inductive molecules. In such cases, the processed surface forms the surface where the dangling bonds are present so the above mentioned methods have a nega-positive relationship.

Also, trivalent metal atoms (B, Al, In, Tl) may be utilized instead of the Ga atom in the example of this embodiment at the structural atom 18 for the ferromagnetic fine line, and a plurality of atom types may be used. For instance, after fabricating the dangling bond row on the hydrogen terminated Si surface, first, a number of Ga atoms identical in number to the dangling bonds may be adsorbed and a structure then fabricated in the same manner as FIG. 3A and FIG. 3B by adsorbing Al, and observations then made utilizing STS to verify the presence of magnetism. For instance, ferromagnetism was actually verified when pentavalent atoms of an As atom array were made to be comprised of dangling bonds. Further, after absorbing bivalent Ca atoms in a number equal to that of the dangling bonds, ferromagnetism was then verified when Ga atoms were supplied. In these cases, the atom array need not always match the details in FIG. 3A and FIG. 3B. What is critical is that there is a matching basic unit for the atom cluster 11 which forms the basic unit of the ferromagnetic fine line of FIG. 3A and FIG. 3B and that the electrons be an odd number so as not to cause a chemical bond within this basic unit. A specific atom position is dependent on the atom type, the number of atoms and substrate surface structure.

<Second Embodiment>

The example in this embodiment shows a magnetoresistance effect element utilizing an atomic size array, a portion of which is comprised of a nonmagnetic fine line and another portion of which is comprised of a ferromagnetic fine line. The atomic cluster 11 forming the basic unit of the ferromagnetic fine line in FIG. 3A and FIG. 3B is characterized in that a state density peak is present in the vicinity of the Fermi level EF as shown in FIG. 2, however the atom types and number of atoms included in this basic unit can, for instance, be controlled by absorbing different types of atoms along with varying the amount of absorption, and the ferromagnetism caused to be lost.

Figure 6A:
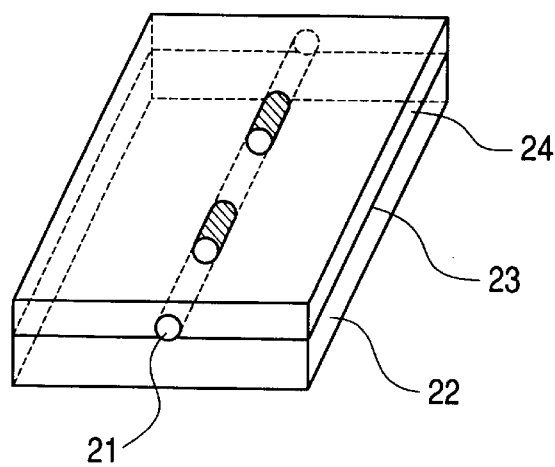
FIG. 6A is a concept view showing a magnetoresistance effect element comprised of a nonmagnetic fine line and ferromagnetic fine line utilizing a nonmagnetic fine line from a portion of the atomic size array.
Figure 6B:
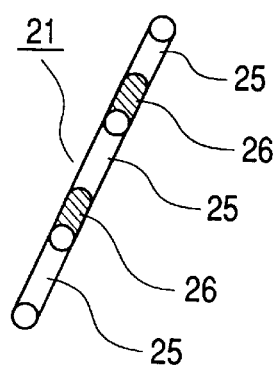
FIG. 6B is a view showing details of the atomic size array.

FIG. 6A is a concept view showing the magnetoresistance effect element comprised of a nonmagnetic fine line and ferromagnetic fine line utilizing a nonmagnetic fine line from a portion of the atomic size array. FIG. 6B is a view showing details of the atomic size array. The atomic size array 21 can be formed from a ferromagnetic fine line 25 or a nonmagnetic fine line 26 such as shown in FIG. 6B in order to show the characteristics of a ferromagnetic fine line 25 or a nonmagnetic fine line 26 in each atomic cluster 11 of FIG. 3A and FIG. 3B which form the basic unit of a ferromagnetic fine line.

A magnetoresistance effect element shown in FIG. 6A can be fabricated by forming an atomic size array 21 embedded in a protective layer 24 and formed from a ferromagnetic fine line or a nonmagnetic fine line on the surface 23 of a substrate 22 just the same as the atomic size array used in FIG. 1. In contrast to a large resistance value shown by 100 kilohms when a small voltage (10 mV) is applied to both ends of the atomic size array 21 and the resistance then measured without applying power to the external magnet site, a satisfactory resistance value shown by 23 kilohms was obtained at the external magnet site with 100 gauss. This magnetoresistance effect element is effective as a magnetic head sensor such as in readout from magnetic heads in high density magnetic recording.

Figure 7:
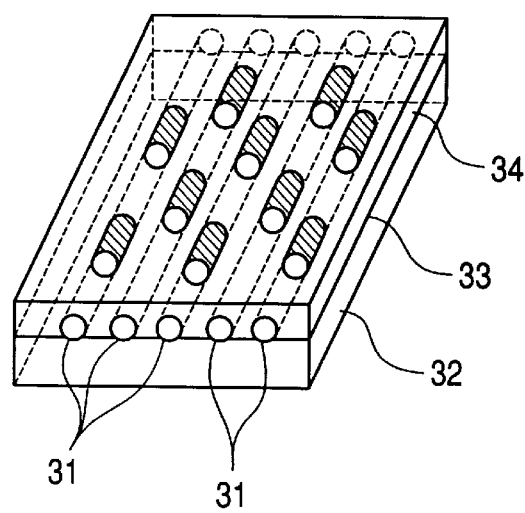
FIG. 7 is a concept view of another configuration of the magnetoresistance effect element comprised of a plurality of atomic size arrays shown in FIG. 6B.

FIG. 7 is a concept view of the magnetoresistance effect element comprised of a plurality of atomic size arrays shown in FIG. 6B.

In FIG. 7, a magnetoresistance effect element having high detection sensitivity compared to the element in FIG. 6A can be fabricated by forming a plurality of atomic size arrays 31 embedded in a protective layer 34 and formed from a ferromagnetic fine line and nonmagnetic fine line on the surface 33 of a substrate 32 just the same as the atomic size array used in FIG. 6B. The high sensitivity of the magnetoresistance effect element increases in proportion to the number of atomic size arrays 31.

Figure 8:
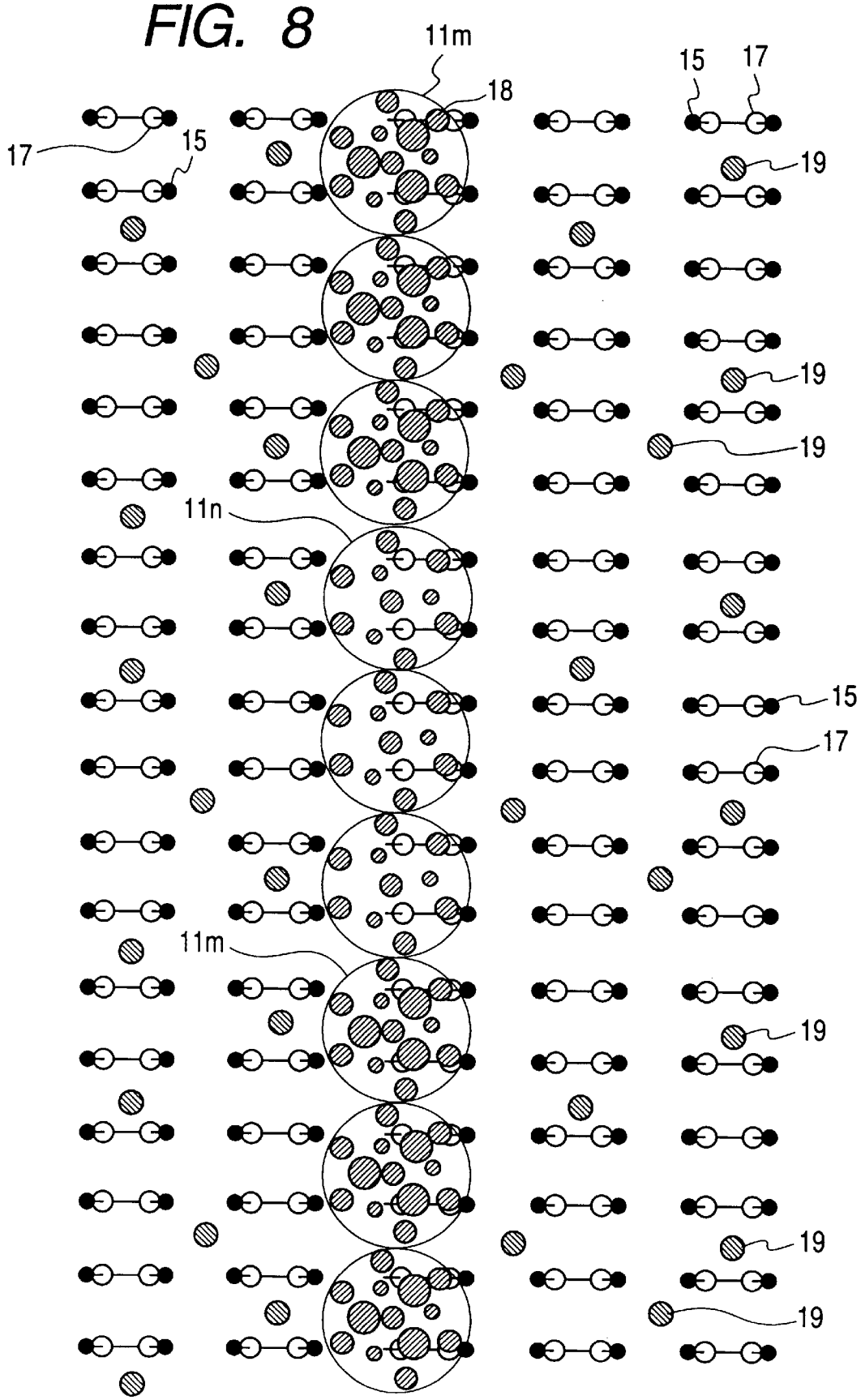
FIG. 8 is a plan view of a portion of the atomic size array shown in FIG. 6A and FIG. 6B without the protective layer, the same as in FIG. 3A.

FIG. 8 is a plan view of a portion of the atomic size array shown in FIG. 6A and FIG. 6B without the protective layer, the same as in FIG. 3A. In the example in the drawing, the atomic cluster 11 forming the basic unit of the ferromagnetic fine line is comprised of three ferromagnetic fine lines 25 and the atomic cluster 11n forming the basic unit without the layer of FIG. 4C is comprised of three nonmagnetic fine lines 26 and this pattern is repeated. In this embodiment, the nonmagnetic fine line 26 has a structure basically similar to the ferromagnetic fine line 25, which similarity is due to the need for electrical current flow in the elements of the magnetoresistance effect element. In the structure in FIG. 8, both the nonmagnetic fine line 26 and the ferromagnetic fine line 25 are roughly equivalent in view of the need to conduct current.

Figure 9A:
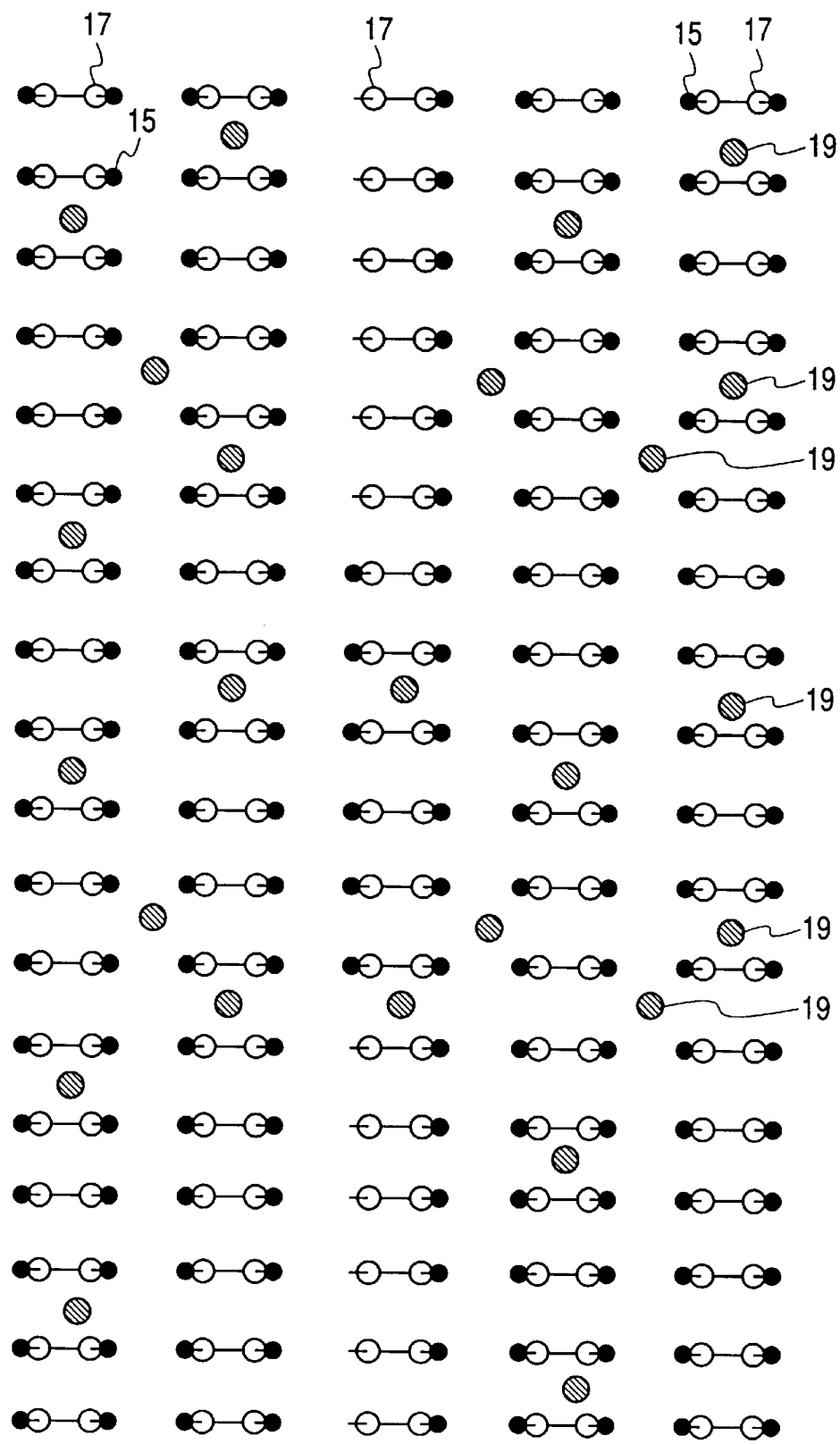
FIG. 9A through FIG. 9C are views illustrating an example of the procedure for forming the atomic array shown in FIG. 8.
Figure 9B:
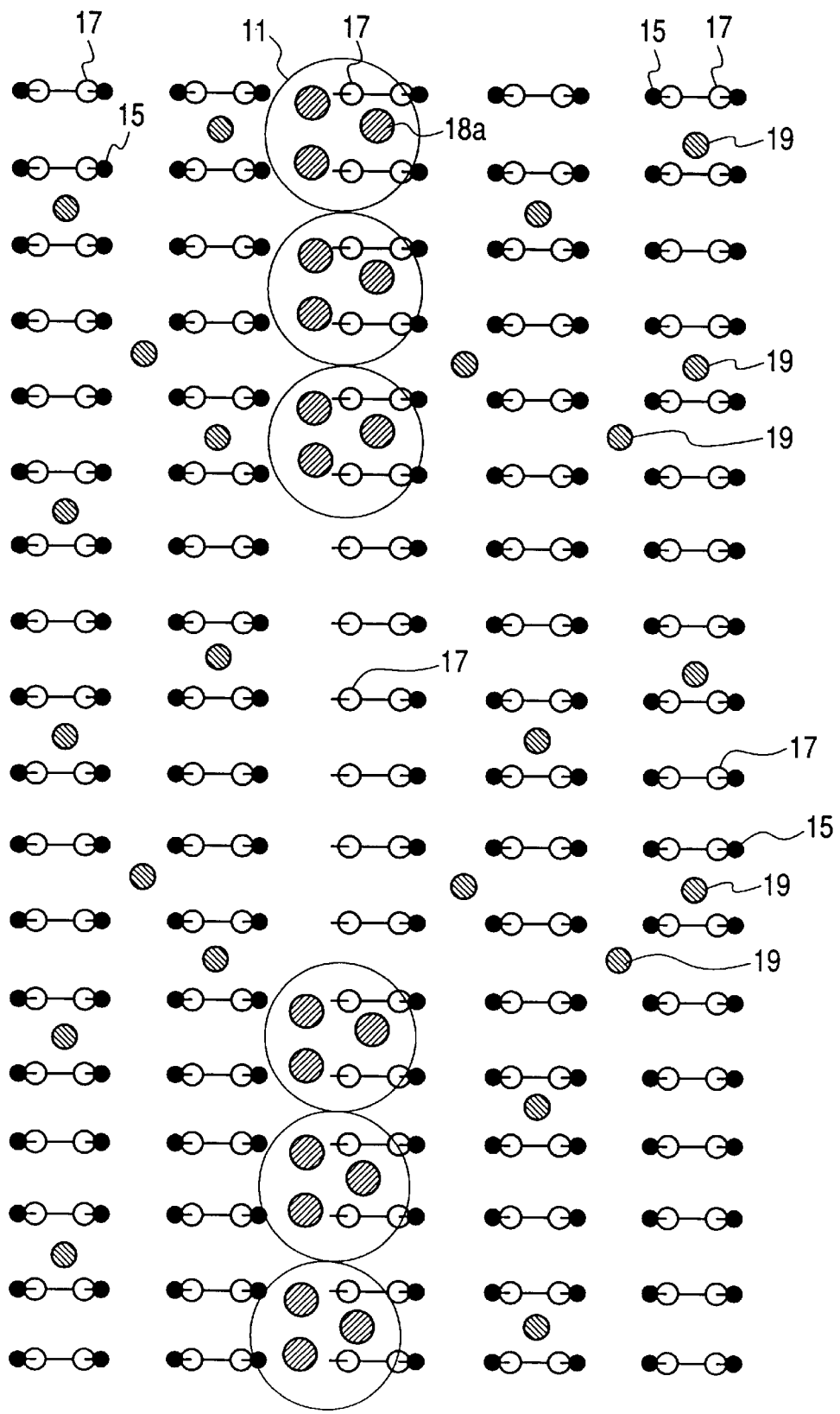
Figure 9C:
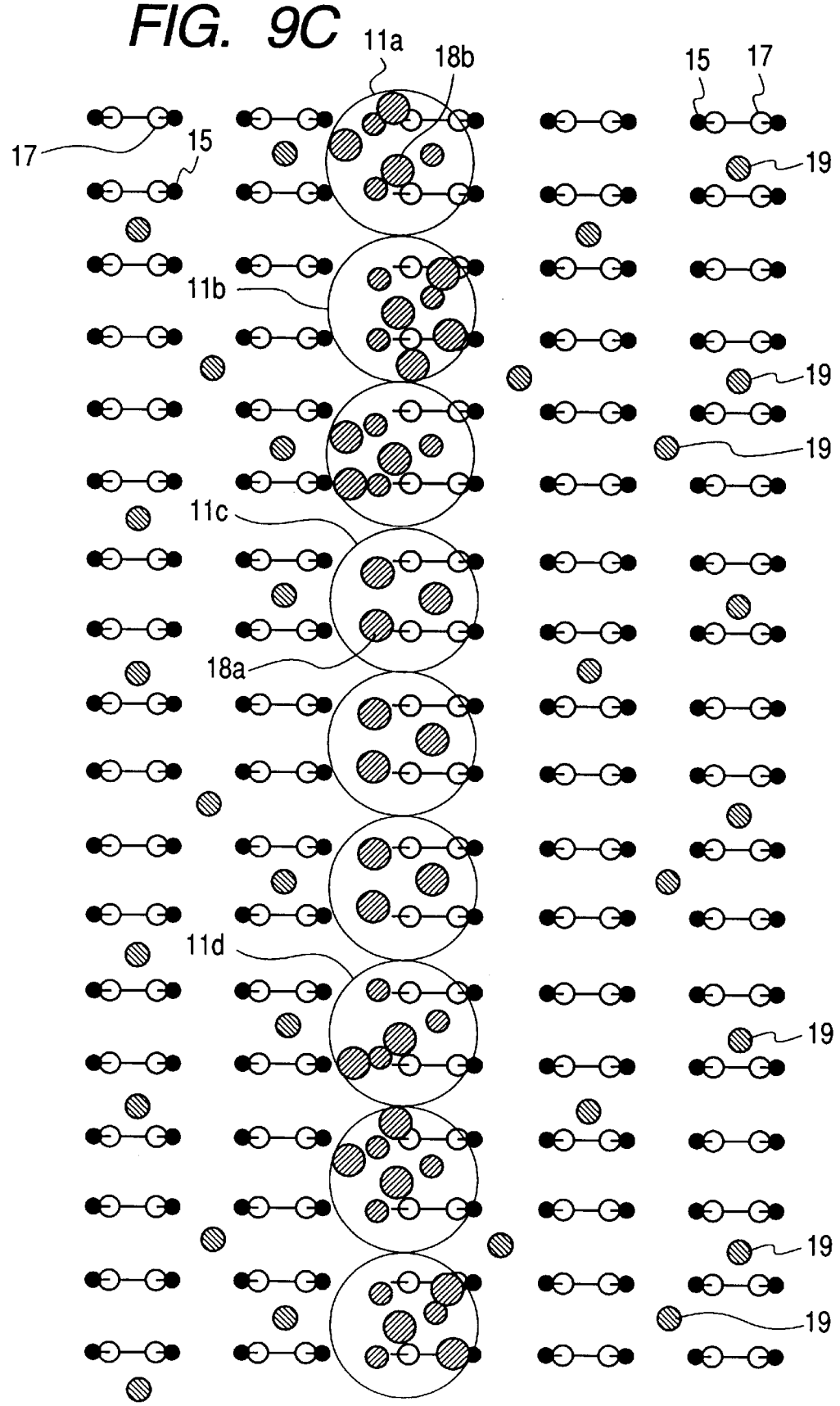

FIG. 9A through FIG. 9C are views illustrating an example of the procedure for forming the atomic array shown in FIG. 8. FIG. 9A shows bonding of the atom 19 (Ti in this example) which has the task of a structural atom to be affixed to the substrate layer 12 of the protective layer 12 and also the fabrication of the dangling Si bond zone at the target position for forming the ferromagnetic fine line 25. FIG. 9B shows the bonding of the structural atom of the substrate with the three atoms 18a of the atom cluster 11 forming the basic unit of the ferromagnetic fine line at the position fabricated as the dangling Si bond position on the substrate surface, and further shows the dangling Si bond zone fabricated at the target position for forming the nonmagnetic fine line 26. At the position fabricated as the dangling Si bond for the substrate surface of the position for forming the nonmagnetic fine line 26, FIG. 9C shows the three atoms 18a of the atom cluster 11 (for instance 11c) forming the basic unit of the ferromagnetic fine line 25 bonded with the structural atom of the substrate, and also shows the three atoms 18b in a laminated state in, for instance, the atomic cluster 11a at the position for forming the ferromagnetic fine line 25. At this time, for instance, the four atoms 18b are laminated (stacked) in the atomic cluster 11b, and the two atoms 18b are laminated (stacked) in the atomic cluster 11d. There are, thus, variations in the laminating (stacking) process for each atom cluster, and if the atoms 18 are stacked at the appropriate time while in this state, then finally a structure as shown in FIGS. 3A and 3B will held at the portion for the ferromagnetic fine line 25 as shown in FIG. 8. Further, at the portion of the nonmagnetic fine line 26, magnetic bodies alternately arranged to have the structure shown in FIGS. 3A and 3B will be held without the layer shown in FIG. 4C.

<Third Embodiment>

Figure 10:
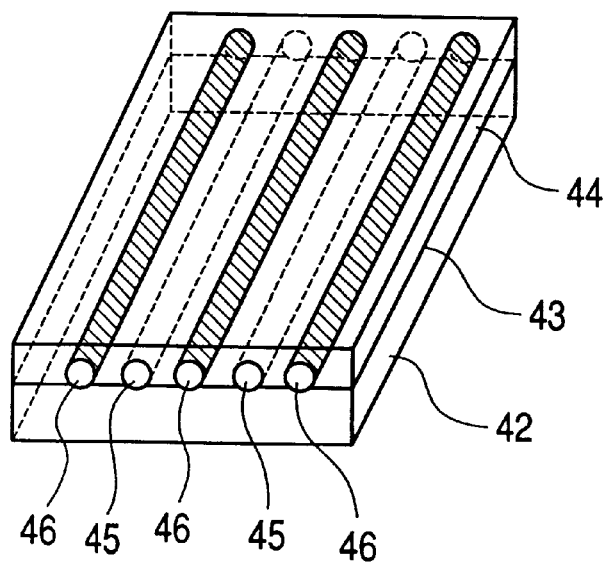
FIG. 10 is a view showing a magnetoresistance effect element mutually comprised of ferromagnetic fine lines comprised totally or almost totally of atomic size arrays; and nonmagnetic fine lines comprised totally or almost totally of atomic size arrays.

FIG. 10 is a view showing a magnetoresistance effect element mutually comprised of ferromagnetic fine lines comprised totally or almost totally of atomic size arrays; and nonmagnetic fine lines comprised totally or almost totally of atomic size arrays. Just as in the second embodiment, the quantity and types of atoms included in the atom cluster forming the basic unit of the ferromagnetic fine line are controlled, and an atomic size array formed totally or almost totally of nonmagnetic fine lines can be fabricated. An atomic size array 45 formed entirely or almost entirely of ferromagnetic fine lines on the surface 43 of the substrate 42 is shown in FIG. 10 along with an atomic size array 46 formed entirely or almost entirely of nonmagnetic fine lines. Further, the magnetoresistance effect element of this embodiment can be fabricated by embedding in the protective layer 44. The structure in FIG. 10 shows a magnetoresistance effect element having about the same degree of detection sensitivity compared with the magnetoresistance effect element of FIG. 7.

<Fourth Embodiment>

Figure 11:
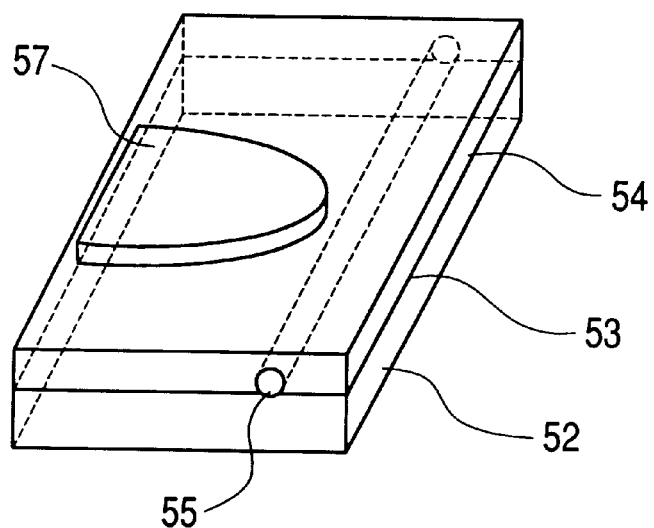
FIG. 11 is a view showing a tunnel resistor magnetic effect element comprised of a ferromagnetic fine line made up of atomic size arrays; and electrode embedded in close proximity to the ferromagnetic fine line.

FIG. 11 is a view showing a tunnel resistor magnetic effect element comprised of a ferromagnetic fine lines made up of atomic size arrays; and electrode embedded in close proximity to the ferromagnetic fine lines. Here, the atomic size array containing the ferromagnetic fine line and the magnetoresistance effect element utilizing the tunnel resistance between electrodes and in proximity to the atomic size array is referred to as a tunnel magnetoresistance effect element. Just as with the second embodiment, the atom types and number of atoms included in the atomic cluster forming the basic unit of the ferromagnetic fine line can be controlled and an atomic size array fabricated comprised of ferromagnetic fine lines in localized positions. As shown in FIG. 11, the tunnel magnetoresistance effect element of this embodiment is fabricated by forming an atomic size array 55 containing a ferromagnetic fine line on the surface 53 of the substrate 52 and an electrode 57 formed on the substrate surface in proximity to (0.5 to 10 nm) the atomic size array 55, and then embedding the atomic size array 55 in the protective layer 54.

The electrode 57 is made with a method similar to the dangling Si bond row as related in the first embodiment and a dangling Si bond region is fabricated in the region of the surface 53 with the STM probe, for forming an electrode. Further, an atomic size array 55, for instance is simultaneously fabricated by adsorption of Ga atoms utilizing a thermal evaporation source. The electrode 57 may be fabricated first utilizing the same method as above. Further, a tunnel magnetoresistance effect device may be fabricated by embedding in a protective layer 54.

By controlling the type of atoms and structure contained in the ferromagnetic fine line in the atomic size array 55, the ferromagnetism is limited to a low temperature zone when, for instance the size is relatively small (1–10 nm). In such cases the exterior magnetization site reacts sensitively and ferromagnetism actually occurs in the ferromagnetic fine line contained in the atomic size array 55. In this case, a large fluctuation occurring in the electron status of the atomic array 55 in the atomic array 55 can be observed in an experiment utilizing STM. When 100 gauss of magnetism is applied while there is no external magnetic site, and a voltage of 0.5V applied between the atomic size array 55 and the electrode 57, an actual five-fold increase in the electrical current can be observed, and a tunnel magnetoresistance effect element obtained.

Figure 12:
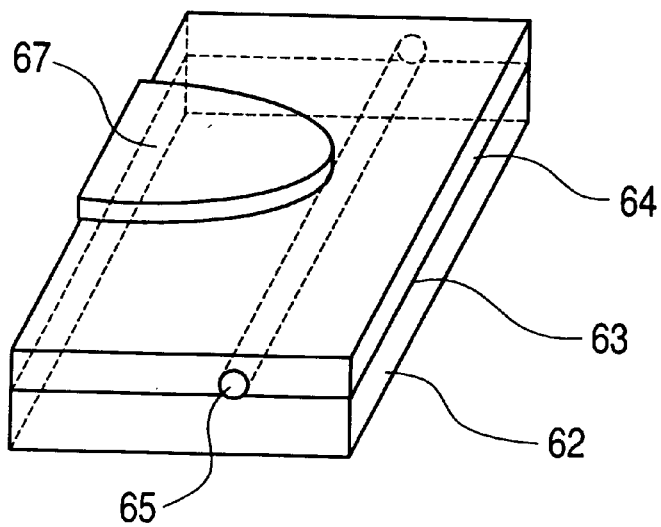
FIG. 12 is a view showing a tunnel resistor magnetic effect element comprised of ferromagnetic fine lines made up of atomic size arrays; and surface electrodes embedded in close proximity to the ferromagnetic fine lines.

FIG. 12 is a view showing a tunnel magnetoresistance effect element comprised of ferromagnetic fine lines made up of atomic size arrays; and surface electrodes embedded in close proximity to the ferromagnetic fine lines. Restated, FIG. 12 is an example of a tunnel magnetoresistance effect element not formed by embedding the electrode in a protective layer, but characterized in employing an electrode 67 formed on the protective layer surface by a method such as vapor deposition of a stable element such as gold (Au). The atomic size array 65 is formed here containing the ferromagnetic fine line on the surface 63 of the substrate 62. The tunnel magnetoresistance effect element is formed with an electrode 67 on the protective surface in proximity (0.5–10 nm) to the atomic size array 65.

Figure 13:
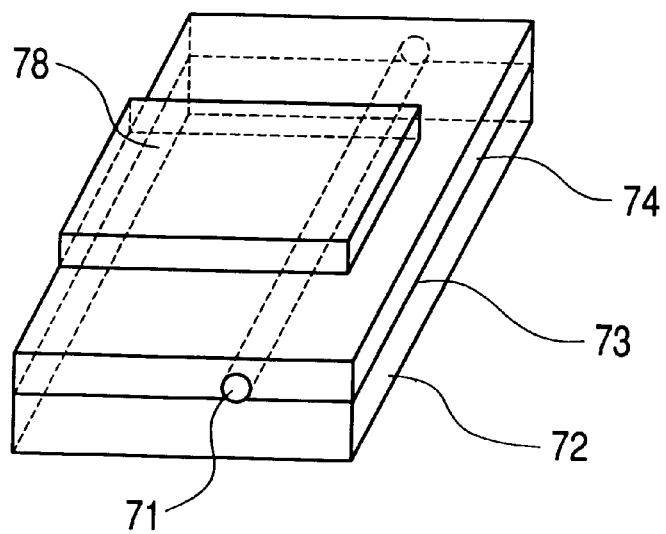
FIG. 13 is a view showing field effect type ferromagnetic fine lines comprised of ferromagnetic fine lines made up of atomic size arrays; and surface electrodes in proximity to the ferromagnetic fine lines.

<Fifth Embodiment>FIG. 13 is a view showing a ferromagnetic fine line formed by means of an atomic size array, and in proximity to said magnetic piece are a field effect type ferromagnetic fine line, a magnetoresistance effect element as well as a tunnel magnetoresistance effect element for controlling magnetic characteristics by means of a voltage applied to a surface or an embedded electrode. This embodiment shows a field effect type ferromagnetic fine line utilizing an atomic size array with an electron state density deviated from the Fermi level.

Just as with the second embodiment, an atomic size array can be obtained whose electron state density is deviated from the Fermi level, by controlling the type of atoms and structure contained in the atomic cluster forming the basic unit of the ferromagnetic fine line. As shown in FIG. 13, an atomic size array 71 is formed on the surface 73 of the substrate 72 with an electron state density deviated from the Fermi level and this array then embedded in the protective layer 74. Further, by forming an electrode 67 on the protective layer surface by a method such as vapor deposition of a stable element such as gold (Au), the field effect type ferromagnetic fine line of this invention can be fabricated. Both ends of the atomic size array 71 form the source electrode and the drain electrode. The gate electrode 78 can be embedded in the protective layer 74 by the same method as shown in the fourth embodiment. The peak of the electron state density of the atomic size array can be overlapped onto the Fermi level and the magnetization of the atomic size array controlled by applying an appropriate voltage (−5 to +5 volts) to the gate electrode 78. FIG. 13 shows a ferromagnetic fine line identical to the example in the first embodiment; however, this ferromagnetic fine line can also be achieved in the second through fourth embodiments and a field effect type ferromagnetic fine line, a magnetoresistance effect element as well as a tunnel magnetoresistance effect element obtained.

<Sixth Embodiment>

Figure 14:
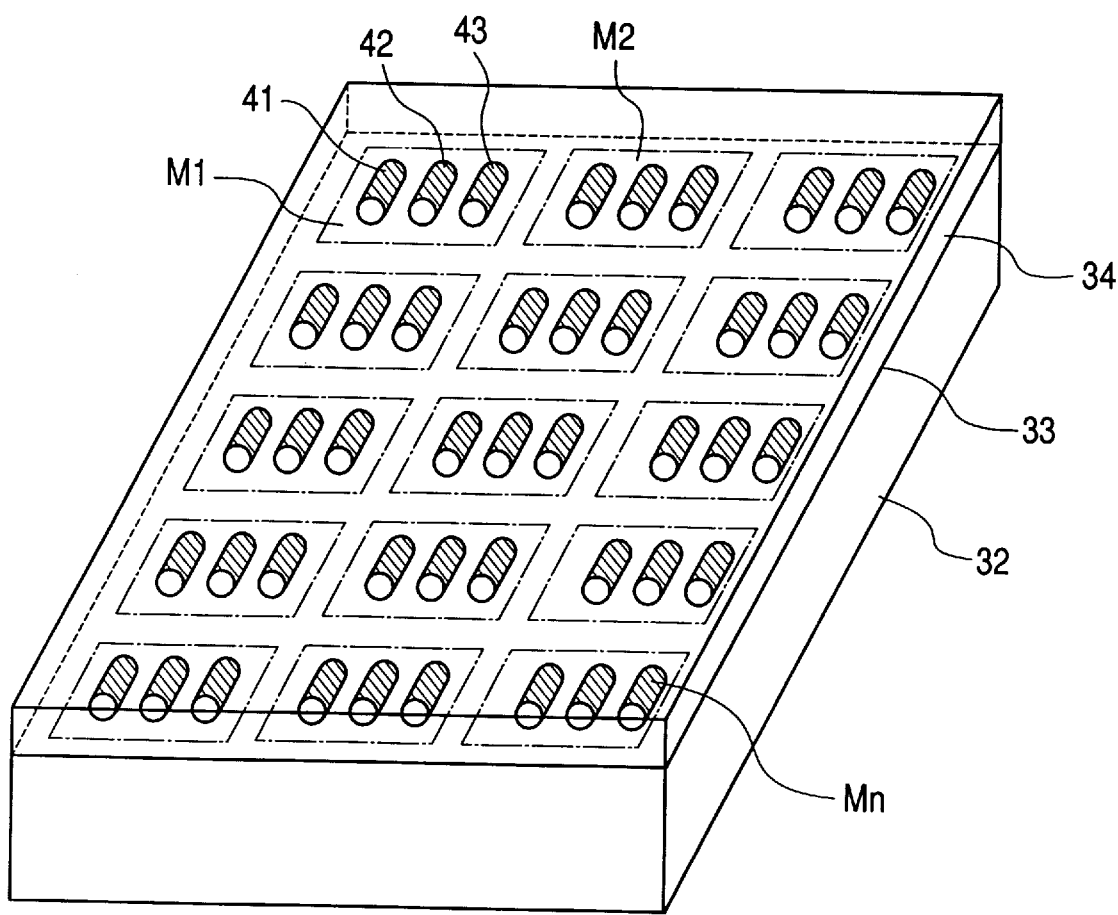
FIG. 14 is an overall view when the magnetic recording medium is formed utilizing ferromagnetic fine lines comprised of atomic size arrays.

FIG. 14 is an overall view when the magnetic recording medium is formed utilizing ferromagnetic fine lines comprised of atomic size arrays. The structure shown in this embodiment resembles that of FIG. 7; however, in this embodiment the ferromagnetic fine lines 41, 42 and 43 are set as one recording element M1, and onwards from M2 - - - Mn. These recording elements M1, M2, - - - Mn are embedded in the protective layer 34 formed on the surface 33 of the substrate 32. In this sixth embodiment, there is no need to conduct electrical current through the magnetic piece. Accordingly, forming a piece connected with a non-magnetic fine line such as shown in the detailed example of FIG. 8 is not required, and this embodiment may be formed simply by arranging just the magnetic pieces in the required density and intervals.

This invention controls magnetization characteristics by means of the proximity of the electrical poles and the atomic level structure, and allows the forming of a ferromagnetic fine line whose magnetization can be protected from adsorption of impurities by embedding the atomic array in a protective layer. Further, this invention makes possible the fabrication of a field effect type ferromagnetic fine line, a magnetoresistance effect element, a tunnel magnetoresistance effect element, and a magnetic recording medium.

What is claimed is:

1. A ferromagnetic material comprising an atomic size array formed from a structure distributed with nonmagnetic atoms on a substrate, wherein said atomic size array is embedded in a protective layer made from nonmagnetic atoms, and an atomic cluster forming a basic unit has a state density peak appearing in the vicinity of the Fermi level.

2. A ferromagnetic material comprising an atomic size array formed from a structure distributed with nonmagnetic atoms on a substrate, wherein said atomic size array is embedded in a protective layer made from nonmagnetic atoms, and an atomic cluster forming a basic unit has a flat section appearing in the vicinity of the Fermi level, for energy band dispersion in the direction of electrical conductivity.

3. A ferromagnetic material according to claim 1, wherein the structural atoms of said atomic size array are comprised of nonmagnetic atoms and magnetic atoms or are comprised of magnetic atoms.

4. A ferromagnetic material according to claim 1, wherein said atomic size array has a basic unit comprised of a single atom or an atomic cluster enclosed by one or a plurality of atoms having a chemical bond with said protective layer, and has one or a plurality of atoms having a chemical bond with the structural atoms of said substrate.

5. A ferromagnetic material according to claim 1, wherein said substrate is a semiconductor or an insulator.

6. A ferromagnetic material according to claim 1, wherein said substrate is a non-conductive substrate terminated as the surface dangling bonds of the semiconductor or an insulator by utilizing atoms or molecules.

7. A ferromagnetic material according to claim 1, wherein said substrate is a non-conductive substrate terminated as the surface dangling bonds of the semiconductor or an insulator by utilizing atoms or molecules, and said atomic array is comprised by distributing one type or a plurality of types of atoms excluding a portion of said atoms or molecules with non-conductive terminations.

8. A magnetoresistance effect element comprising an atomic size array formed from a structure distributed on a substrate with nonmagnetic atoms, wherein said atomic size array is embedded in a protective layer made from nonmagnetic atoms, a basic unit being an atomic cluster appearing at the state density peak in the vicinity of the Fermi level, and wherein one portion of said atomic size array is comprised of nonmagnetic material and another portion is comprised of ferromagnetic material.

9. A magnetoresistance effect element according to claim 8, further comprises a plurality of atomic size arrays.

10. A magnetoresistance effect element according to claim 9, wherein said plurality of atomic size arrays are comprised of an atomic size array consisting entirely or almost entirely of ferromagnetic material and of an atomic size array consisting entirely or almost entirely of nonmagnetic material.

11. An atomic level device showing a tunnel magnetoresistance effect and comprising an atomic size array formed from a structure distributed on a substrate with nonmagnetic atoms, wherein said atomic size array is embedded in a protective layer made from nonmagnetic atoms, a basic unit being an atomic cluster appearing at the state density peak in the vicinity of the Fermi level, and wherein said atomic size array further comprises electrodes embedded in close proximity.

12. An atomic level device showing a tunnel magnetoresistive effect and comprising an atomic size array formed from a structure distributed on a substrate with nonmagnetic atoms, wherein said atomic size array is embedded in a protective layer made from nonmagnetic atoms, a basic unit being an atomic cluster appearing at the state density peak in the vicinity of the Fermi level, and wherein said atomic size array further comprises surface electrodes embedded in close proximity.

13. An atomic level device showing a tunnel magnetoresistance effect and comprising an atomic size array formed from a structure distributed on a substrate with nonmagnetic atoms, wherein said atomic size array is embedded in a protective layer made from nonmagnetic atoms, a basic unit being an atomic cluster appearing at the state density peak in the vicinity of the Fermi level, and further comprising embedded electrodes or surface electrodes in close proximity to said atomic size array, wherein magnetization characteristics are caused by application of a voltage to said embedded electrodes or said surface electrodes.

14. An atomic level device showing a tunnel magnetoresistance effect and comprising an atomic size array formed from a structure distributed on a substrate with nonmagnetic atoms, wherein said atomic size array is embedded in a protective layer made from nonmagnetic atoms, a basic unit being an atomic cluster appearing at the state density peak in the vicinity of the Fermi level, an intermediate connection electrode pattern is formed by processing th e substrate surface previously made inert with dangling bonds, using a scanning tunnel microscope or a scanning probe microscope in a process to activate the dangling bond, and connecting an external electrode and said atomic size array by means of the intermediate connection electrode formed by depositing metal atoms.

15. A magnetic recording medium comprising an atomic size array formed from a structure distributed on a substrate with nonmagnetic atoms, wherein said atomic size array is embedded in a protective layer made from nonmagnetic atoms, a basic unit being an atomic cluster appearing at the state density peak in the vicinity of the Fermi level, and wherein said atomic size array further comprises a specific periodic type array of ferromagnetic material and nonmagnetic materials arrayed at specified intervals.

* * * * *